S. W. HAYES.
SAFETY CONNECTING ROD.
APPLICATION FILED MAR. 6, 1909.
985,672.
Patented Feb. 28, 1911.
2 SHEETS—SHEET 1.
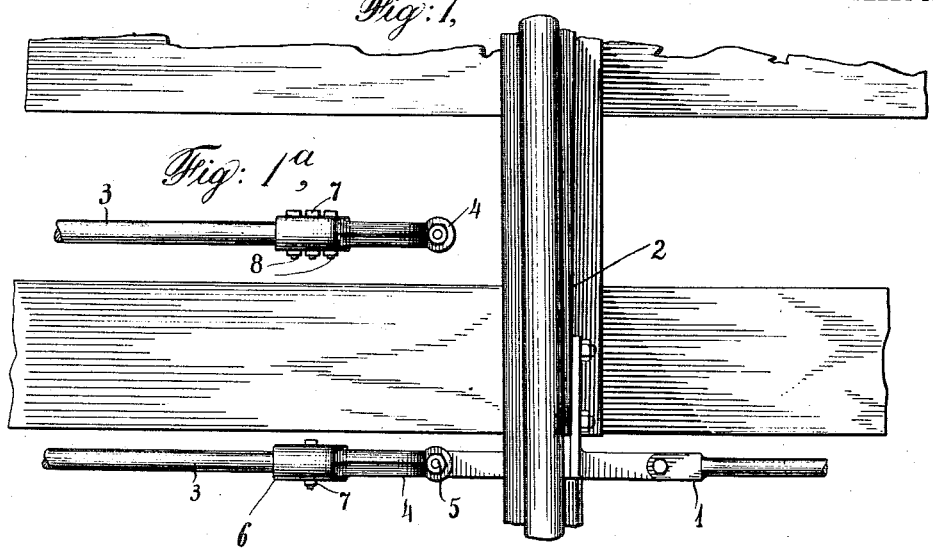
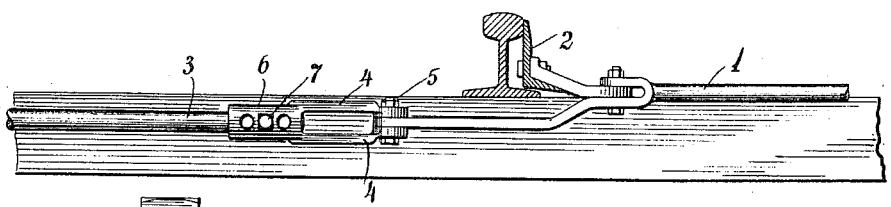
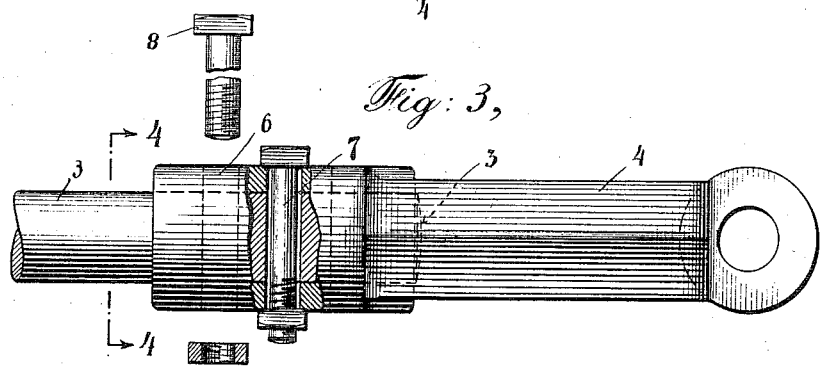
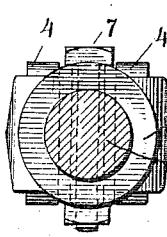

S. W. HAYES.
SAFETY CONNECTING ROD.
APPLICATION FILED MAR. 6, 1909.

985,672.

Patented Feb. 28, 1911.

2 SHEETS—SHEET 2.

Witnesses:
M. Guertner.
John J. McElhinny

Stanley W. Hayes
Inventor
By his Attorney
H. G. Kimball

UNITED STATES PATENT OFFICE.

STANLEY W. HAYES, OF GENEVA, NEW YORK.

SAFETY CONNECTING-ROD.

985,672.

Specification of Letters Patent.

Patented Feb. 28, 1911.

Application filed March 6, 1909. Serial No. 481,623.

*To all whom it may concern:*

Be it known that I, STANLEY W. HAYES, a citizen of the United States of America, residing at Geneva, in the county of Ontario and State of New York, have invented certain new and useful Improvements in Safety Connecting-Rods, of which the following is a full, true, and concise specification.

The invention is a safety connecting rod for the connections between split switches and their switch-stands or for other uses, and consists of a longitudinally operating rod having a detachable connection device held upon it by means of a rupturable and easily replaceable member which is sufficient to transmit all ordinary strains from the rod to the switch-point, or vice versa, and with the requisite rigid force, but yields to abnormal or excessive strains, such as occur, for example, when a car-wheel trails through a closed and locked switch from the wrong track. The rupture of the replaceable part prevents injury or derangement of the switchstand or switch, and at the same time affords a visible indication of the condition of the apparatus and the need of repair.

The invention also contemplates and includes provisions for rendering the connecting rod entirely rigid and non-yielding even to the abnormal strains just referred to, when so desired, and so that the device may be used alternately in the function above described or in place of the ordinary one-piece switch connecting-rod well known to those familiar with this art.

The above and further features of the invention are explained in full in the following specification, and more particularly pointed out in the claims.

Figure 5:
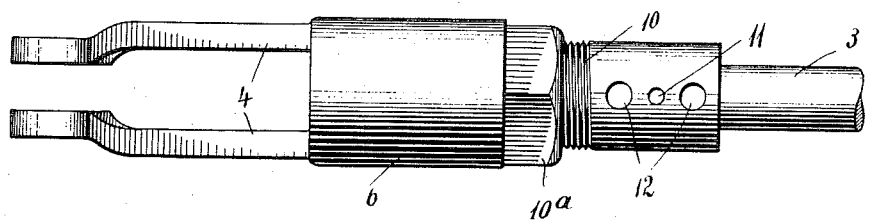
Figure 6:
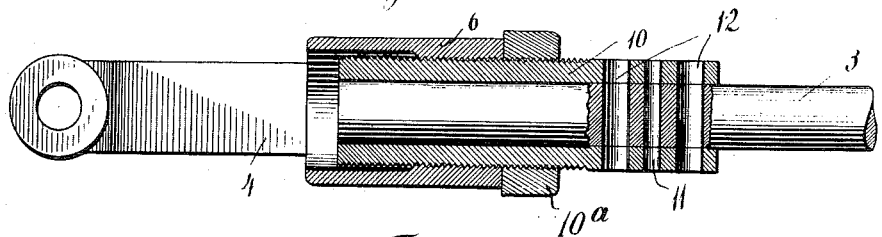
Figure 7:
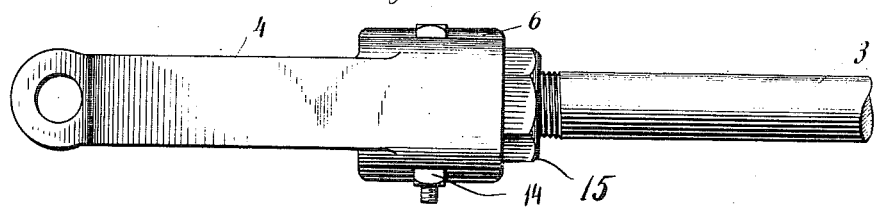
Figure 8:
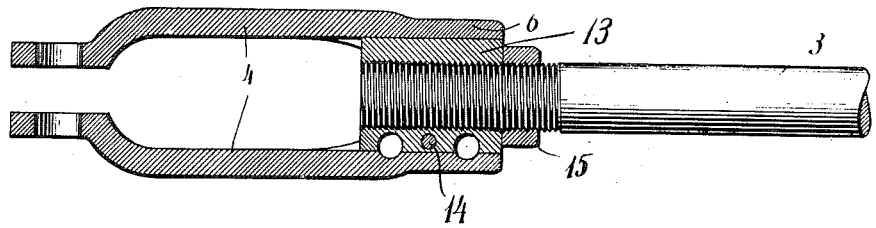
Figure 9:
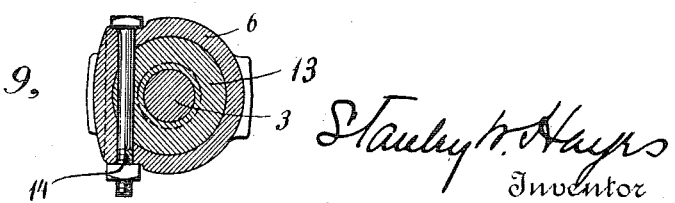

In the drawings forming a part hereof, Figure 1 is a top plan view of a split switch point with a connecting rod embodying my invention employed therewith; Fig. 1ª is a detached view of the connecting rod rendered non-yielding; Fig. 2 is a side elevation of the parts of Fig. 1; Fig. 3 is an enlarged plan of the connection device and a portion of the switch rod with parts broken away and in section; and Fig. 4 is a cross-section of Fig. 3 on line 4—4; Figs. 5 and 6 represent, in side elevation and longitudinal sections, respectively, a further embodiment of this invention; Figs. 7 and 8 represent a still further embodiment; Fig. 9 being a cross-section of the device of Fig. 7 taken in the plane of the shear-bolt.

In Figs. 1 and 2 the numeral 1 designates a portion of the usual bridle-rod connecting the switch points 2, only one of which is illustrated. The horizontal switch-rod 3 operated in a longitudinal direction from its switch stand (not shown) is connected to the rod 1 by means of the connection device shown more clearly in Fig. 3. This device is forked at one end for attachment to the rod 1 and the forked members 4 thereof are perforated to receive the connection bolt 5 which passes through the eye in the end of the rod. The other end of the device is formed as a tubular tang 6, whose interior bore extends entirely through the device and fits over the terminal portion of the switch-rod 3 so as to be guided to move thereon in a direction substantially parallel with the surface of the latter. The tubular tang portion and the terminal portion of the switch rod are cross-perforated with one or more perforations and are rigidly secured within certain predetermined limits of strain against relative endwise movement one upon the other by means of a shear bolt 7 which is passed through the registering perforations in both parts and held in place by a suitable nut. The bolt 7 is somewhat narrower than the perforations, fitting one or both of them rather loosely and being held in place by its head and nut or by any other suitable or equivalent means so that a shearing cut may be effected upon it by the adjacent edges of the perforations in the tang and switch-rod terminal. The appropriate cross-section of the shear bolt is determined by the degree of strain at which it is desired the shearing or rupture shall take place.

As thus assembled the connecting rod will serve ordinary switch shifting purposes in the same manner as integral connecting rods, but will shear the bolt when subject to excessive strain, as in the case above mentioned, so that the other apparatus is saved from injury. The ruptured or sheared condition of the bolt is indicated by the rod itself, which may be seen either protruding into the space between the forked members 4 or, if the shearing action took place in the opposite direction, exposing its perforations at the other end of the tang, or by the absence of bolt-head and nut, in any case giving an immediate and conspicuous signal of the occurrence of a rupture and the need of repair, which latter can be readily accomplished in an obvious manner and at a trifling cost of time and materials. The terminal portion of the switch-rod is preferably provided with several cross-perforations adapted to register with corresponding perforations in the tang portion of the connecting device so that ordinary bolts may be inserted in them to serve as auxiliary holding means. These bolts, as shown in Fig. 1ª and also at 8 in Fig. 3, fit their perforations in the ordinary manner or rather snugly, as distinguished from the shear bolt, which is of a less cross-section, and when in place will hold the parts of the device with a rigidity substantially equal to that of a one-piece jaw or a connection head forged on the switch-rod. The device may thus be used interchangeably with such one piece rods. There are conveniently two of such auxiliary non-shearing bolts disposed one on each side of the shear bolt, and when not in use the bolt-holes thereof serve to increase the conspicuousness of the indication afforded by the rod when a rupture has taken place.

The invention further includes provisions for adjustment of the length of the connecting rod, embodied with the rupturable structure above described. In the form shown in Figs. 5 and 6 the tubular tang 6 of the connection device is provided with an adjustable part or sleeve 10, threaded thereto as indicated and receiving the end of the connecting rod proper. The hole 11 for the shear bolt and the holes 12 for the non-shearing bolts are formed in the adjustable sleeve and in the rod and have respectively the same functions as above described, adjustment being accomplished by rotating the sleeve, relatively, within the tang.

In Figs. 7 and 8 which represent the preferred form, the terminal portion of the rod 3 is in the form of a sleeve 13 threaded to the end thereof so as to be longitudinally adjustable thereon and the outside of the said sleeve is movable within and parallel to the interior bore of the tang 6, which latter is formed with a lateral enlargement, as shown in Fig. 9, for the accommodation of the cross-perforations of which there are preferably three as before. The smaller perforation in the tang registers with a corresponding perforation in the side of the sleeve 13, for the reception of the shear bolt 14, and the other, larger, perforations register with perforations or open cylindrical slots in the side of the sleeve, as indicated, for securing the parts in non-yielding condition. The smaller perforation may be similarly arranged as an open slot in the sleeve 13 if desired. Lock nuts 10ª and 15 are preferably supplied for setting the adjustment in each of the above devices.

I claim the following:

1. A safety connecting rod for which points, &c., comprising a cross perforated switch-rod and a forked connection device therefor provided with a tubular tang portion receiving said switch rod and cross-perforated in registry therewith, in combination with a replaceable shear bolt held in said cross-perforations and adapted to yield to a predetermined endwise strain on the said parts.

2. A safety connecting rod for switch points, &c., comprising a longitudinally operating switch rod cross-perforated in its terminal portion and a connection device for said rod having a cross-perforated tang portion disposed in overlapping engagement with said terminal portion and movable parallel with its surface of engagement therewith, in combination with a shear bolt adapted to be secured in the registering cross-perforations of said parts as a yieldable fastening means therefor, and auxiliary means for rendering the connection between said parts practically non-yielding.

3. A safety connecting rod for switch points, &c., comprising a longitudinally operating switch-rod provided with a number of cross-perforations in its terminal portion and a connection device for said rod having a tang portion provided with corresponding cross-perforations and disposed in overlapping engagement with said switch-rod terminal portion and guided so as to be movable parallel with its surface of engagement therewith, in combination with fastening means for said overlapping parts comprising a shear bolt adapted for loosely fitting one of said perforations and other bolts adapted for snugly fitting the other of said perforations.

4. In a device of the kind described, a switch rod having a longitudinally adjustable terminal portion and a connection device having a tubular tang embracing said adjustable portion and a rupturable member securing the same thereto and adapted to yield to a predetermined endwise strain on said rod.

5. In a device of the kind described, a switch rod, a longitudinally adjustable connection device therefor having combined therewith a rupturable securing member adapted to yield to a predetermined endwise strain and provided with auxiliary means for securing said parts non-yieldingly.

6. A safety connecting rod adapted for connection between a switch stand and a track member, having combined therewith a rupturable securing member adapted to yield to a predetermined endwise strain in said rod, and provided with auxiliary means for securing said parts non-yieldingly.

7. A connecting device of the kind described, comprising a sleeve forming the terminal portion of one of the members to be connected and being longitudinally adjustable thereon, in combination with a casing receiving said sleeve and forming the terminal portion of the other of said members, said sleeve and casing having registering perforations at one side of their respective axes and a bolt in said perforations adapted to yield to a predetermined endwise strain in the said device.

In testimony whereof, I have signed my name to the specification in the presence of two subscribing witnesses.

STANLEY W. HAYES.

Witnesses:
 WILLIAM S. SILSBY,
 JESSE B. CONTANT.